United States Patent
Basar et al.

(10) Patent No.: US 9,033,222 B2
(45) Date of Patent: *May 19, 2015

(54) APPARATUS FOR PREVENTION OF READING OF MAGNETIC CARDS

(71) Applicants: Kronik Elektrik Elektronik Ve Bilgisayar Sistemleri Sanayi Ticaret Limited Sirketi, Istanbul (TR); TMD Holding B.V., Blaricum (NL)

(72) Inventors: Cihat Celik Basar, Istanbul (TR); Hakan Askeroglu, Istanbul (TR); Ismet Yesil, Istanbul (TR)

(73) Assignees: Kronik Elektrik Elektronik Ve Bilgisayar Sistemleri Sanayi Ticaret Limited Sirketi, Istanbul (TR); TMD Holding B.V., HS Blaricum (NL)

(*) Notice: Subject to any disclaimer, the term of this patent is extended or adjusted under 35 U.S.C. 154(b) by 0 days.

This patent is subject to a terminal disclaimer.

(21) Appl. No.: 13/967,049

(22) Filed: Aug. 14, 2013

(65) Prior Publication Data

US 2014/0158758 A1 Jun. 12, 2014

Related U.S. Application Data

(63) Continuation of application No. 11/570,990, filed as application No. PCT/TR2005/000007 on Mar. 8, 2005, now Pat. No. 8,517,268.

(30) Foreign Application Priority Data

Jun. 24, 2004 (TR) .................... 2004 01513

(51) Int. Cl.
*G06Q 40/00* (2012.01)
*G07D 11/00* (2006.01)
(Continued)

(52) U.S. Cl.
CPC .............. *G06K 7/082* (2013.01); *G06K 7/0091* (2013.01); *G07F 19/20* (2013.01); *G07F 19/201* (2013.01); *G07F 19/2055* (2013.01); *G07F 19/207* (2013.01)

(58) Field of Classification Search
CPC .............................. G07F 19/20; G07F 19/2055
USPC ................. 235/379, 380, 381, 382, 449, 450; 705/43
See application file for complete search history.

(56) References Cited

U.S. PATENT DOCUMENTS 4,130,242 A 12/1978 Mannion
4,245,902 A 1/1981 Cataldo
(Continued)

FOREIGN PATENT DOCUMENTS

EP 0411185 A1 8/1989
EP 1394728 A1 6/1993
(Continued)

OTHER PUBLICATIONS

IBM Technical Disclosure Bulletin (Nov. 1983) vol. 26 No. 6 "Unauthorized Card Stripe Reading Inhibitor".
(Continued)

*Primary Examiner* — Daniel Walsh
(74) *Attorney, Agent, or Firm* — Swanson & Bratschun, L.L.C.

(57) ABSTRACT

A card reading machine includes a card reader for reading data on a magnetic card and a device for preventing reading of the data on the magnetic card by illegal card reading devices operatively associated with the card reading machine. The device for preventing may include an oscillator, a driver circuit and a coil for generating electromagnetic signals similar to data on a card. A method for preventing reading of data on a magnetic card by in illegal card reader in operative association with an apparatus having a card reader intended to read the data on the magnetic card includes producing a signal ruining the data collected by the illegal card reader. The apparatus having a card reader may include an insertion slot in which case the method may further include producing the signal near the insertion slot.

17 Claims, 4 Drawing Sheets

(51) Int. Cl.
*G07F 19/00* (2006.01)
*G06K 5/00* (2006.01)
*G06F 7/08* (2006.01)
*G06K 7/08* (2006.01)
*G06K 7/00* (2006.01)

(56) References Cited

U.S. PATENT DOCUMENTS

| | | | |
|---|---|---|---|
| 4,420,751 A | 12/1983 | Paganini et al. | |
| 4,514,623 A | 4/1985 | Baus et al. | |
| 4,644,482 A | 2/1987 | Juanarena | |
| 4,942,464 A | 7/1990 | Milatz | |
| 5,812,762 A | 9/1998 | Kim | |
| 5,955,961 A | 9/1999 | Wallerstein | |
| 5,992,740 A | 11/1999 | Zocca | |
| 6,367,695 B1* | 4/2002 | Mair et al. | 235/380 |
| 6,390,367 B1* | 5/2002 | Doig | 235/436 |
| 6,422,475 B1* | 7/2002 | May | 235/492 |
| 6,629,643 B1* | 10/2003 | Nagata et al. | 235/475 |
| 6,731,778 B1* | 5/2004 | Oda et al. | 382/118 |
| 6,782,739 B2* | 8/2004 | Ratti et al. | 73/146 |
| 7,004,385 B1 | 2/2006 | Douglass | |
| 7,045,996 B2 | 5/2006 | Lyon | |
| 7,127,236 B2 | 10/2006 | Khan | |
| 7,143,934 B2* | 12/2006 | Ghisani | 235/379 |
| 7,151,451 B2* | 12/2006 | Meskens et al. | 340/552 |
| 7,281,656 B2* | 10/2007 | Nagata et al. | 235/449 |
| 7,317,315 B2 | 1/2008 | Aizawa | |
| 7,377,434 B2* | 5/2008 | Wakabayashi | 235/449 |
| 7,841,528 B2 | 11/2010 | Savry | |
| 7,866,556 B2* | 1/2011 | Pedigo et al. | 235/449 |
| 8,397,991 B2* | 3/2013 | Mueller | 235/450 |
| 8,577,034 B2* | 11/2013 | Lehner | 380/252 |
| 2001/0011684 A1 | 8/2001 | Krause | |
| 2002/0053973 A1 | 5/2002 | Ward | |
| 2003/0062891 A1 | 4/2003 | Slates | |
| 2004/0026507 A1* | 2/2004 | Nagata et al. | 235/449 |
| 2004/0035929 A1* | 2/2004 | Okada | 235/438 |
| 2004/0094628 A1* | 5/2004 | Yoshii | 235/475 |
| 2004/0129772 A1* | 7/2004 | Ramachandran et al. | 235/379 |
| 2004/0141058 A1* | 7/2004 | Ramachandran et al. | 348/150 |
| 2004/0141059 A1* | 7/2004 | Enright et al. | 348/150 |
| 2004/0200894 A1* | 10/2004 | Ramachandran et al. | 235/379 |
| 2005/0006465 A1* | 1/2005 | Ghisani | 235/381 |
| 2005/0167495 A1 | 8/2005 | Morley | |
| 2005/0173530 A1 | 8/2005 | DeLand | |
| 2006/0000886 A1* | 1/2006 | Clark et al. | 235/379 |
| 2006/0118624 A1* | 6/2006 | Kelso et al. | 235/444 |
| 2007/0040023 A1* | 2/2007 | Ruggirello et al. | 235/382 |
| 2007/0057070 A1* | 3/2007 | Scarafile et al. | 235/475 |
| 2007/0131768 A1* | 6/2007 | Wakabayashi | 235/449 |
| 2008/0251583 A1* | 10/2008 | Ko | 235/449 |
| 2009/0050699 A1* | 2/2009 | Basar et al. | 235/436 |
| 2009/0078761 A1 | 3/2009 | Sines | |
| 2009/0159676 A1* | 6/2009 | Schliebe et al. | 235/436 |
| 2011/0006112 A1* | 1/2011 | Mueller | 235/379 |
| 2011/0135092 A1* | 6/2011 | Lehner | 380/252 |
| 2012/0043379 A1 | 2/2012 | Ramachandran | |
| 2012/0043380 A1* | 2/2012 | Schliebe et al. | 235/379 |
| 2012/0280041 A1* | 11/2012 | Ross et al. | 235/439 |
| 2012/0280782 A1* | 11/2012 | Ross et al. | 340/5.3 |
| 2013/0056534 A1* | 3/2013 | Ramachandran et al. | 235/379 |
| 2013/0141141 A1* | 6/2013 | Yesil et al. | 327/110 |
| 2013/0161388 A1* | 6/2013 | Mitchell | 235/436 |
| 2013/0299586 A1* | 11/2013 | Yesil et al. | 235/449 |
| 2014/0151449 A1* | 6/2014 | Jenkins et al. | 235/379 |
| 2014/0151450 A1* | 6/2014 | Lewis et al. | 235/379 |
| 2014/0158768 A1* | 6/2014 | Ray et al. | 235/449 |
| 2014/0312117 A1* | 10/2014 | Neubauer | 235/449 |
| 2014/0372305 A1* | 12/2014 | Ray et al. | 705/44 |

FOREIGN PATENT DOCUMENTS

| | | |
|---|---|---|
| EP | 0790590 A1 | 2/1997 |
| EP | 1043704 | 3/2000 |
| GB | 2351590 | 5/2000 |
| JP | 59-99578 | 8/1984 |
| JP | H6262821 | 9/1994 |
| JP | 200167524 | 3/2001 |
| JP | 2003223602 | 8/2003 |

OTHER PUBLICATIONS

Larousse Dictionary of Science and Technology (1995) Ed. Peter M B Walker, Larousse plc, pp. 597 and 752.

* cited by examiner

APPARATUS FOR PREVENTION OF READING OF MAGNETIC CARDS

RELATED APPLICATIONS

This application is a Continuation of U.S. patent application Ser. No. 11/570,990, filed Oct. 24, 2008, entitled "Apparatus for Prevention of Reading of Magnetic Cards," which is a national phase WO 2006/001781, App. No. PCT/TR2005/000007, filed Mar. 8, 2005. WO 2006/001781 claims priority to Turkish Application No. 2004/01513, filed Jun. 24, 2004. Each of the priority documents are hereby incorporated by reference.

TECHNICAL FIELD

This invention is regarding prevention of reading of cards with a magnetic stripe by undesired people.

BACKGROUND

Some people with bad intentions read the information on the stripes of magnetic cards belonging to clients at automated teller machines (ATM) owned by banks and accessible for utilization by banks' clients by reading them by means of a device (card reader) that they stick in the card insertion slot of an ATM machine and store this information, and afterwards copy this information onto another card and can access clients' accounts and this process continues until it is noticed or the account is depleted. Our invention has been designed to prevent this situation, and to prevent banks and banks' clients from suffering from a loss.

For this purpose, to prevent the electronic card fastened by sticking in the card insertion slot of an automated teller machine by people with bad intentions from accurately reading and consequently recording, that is, for the purpose of ensuring that the reader makes errors during the reading process, near where this device can possibly be installed, a coil with a ferrite core is placed and signals similar to the data on a card but self-repeating are formed around this coil. As the reader cannot precisely read the data on a card, it will not be able to record, and people with bad intentions will not capture the data on the magnetic card.

DETAILED DESCRIPTION

Figure 1:
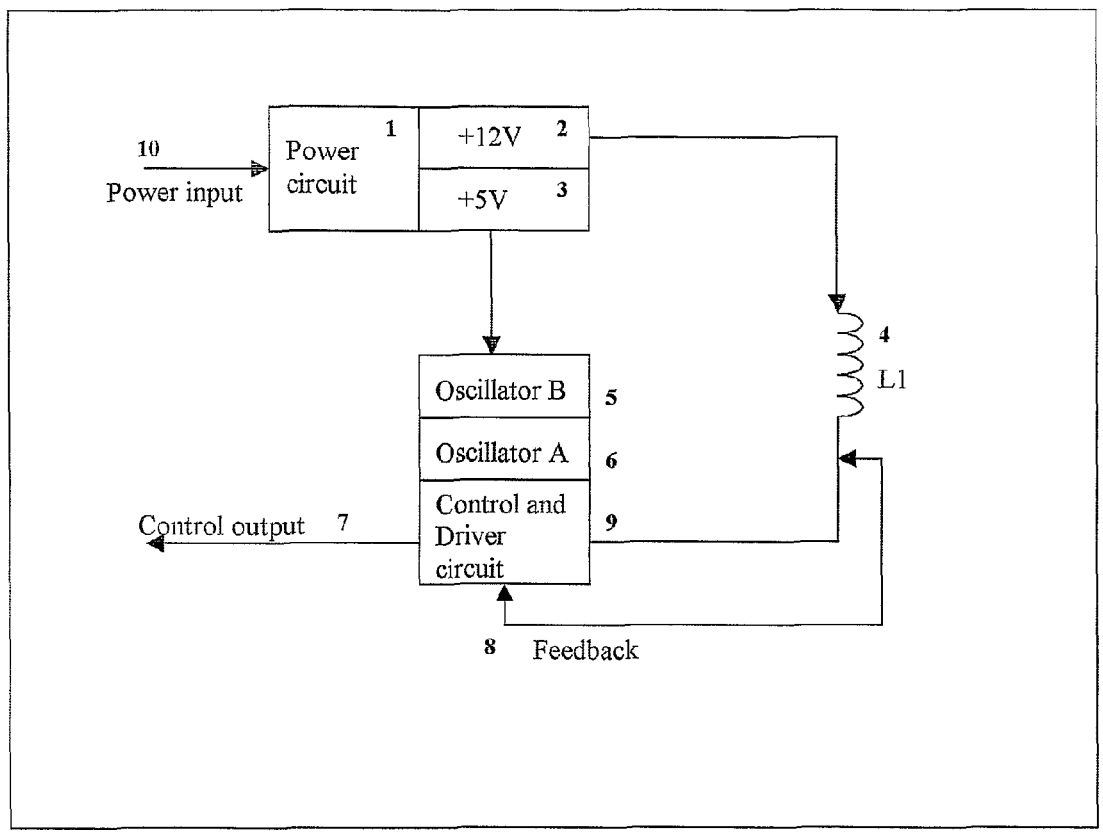
FIG. 1 shows the block diagram of the invention.
Figure 2:
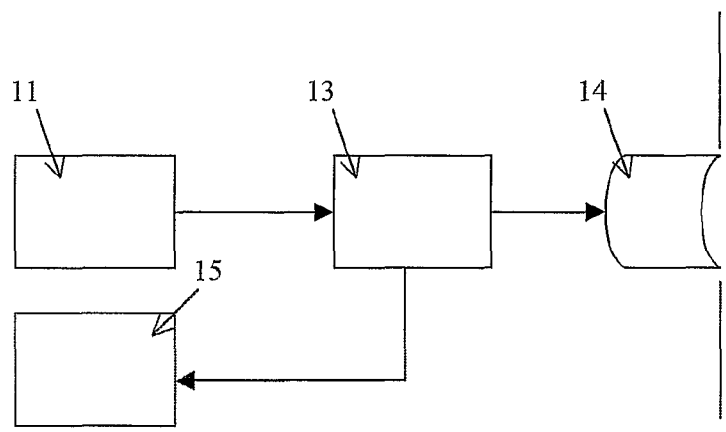
FIG. 2 shows the way that a regular ATM machine operates as a block.
Figure 3:
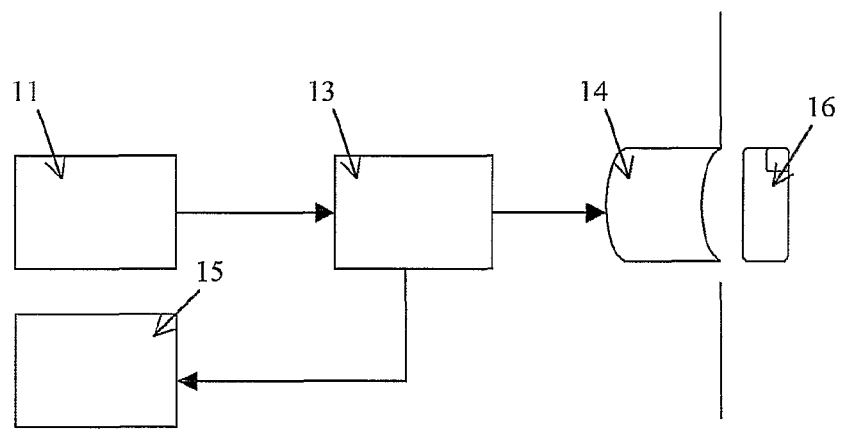
FIG. 3 shows positioning of the illegal copying device.
Figure 4:
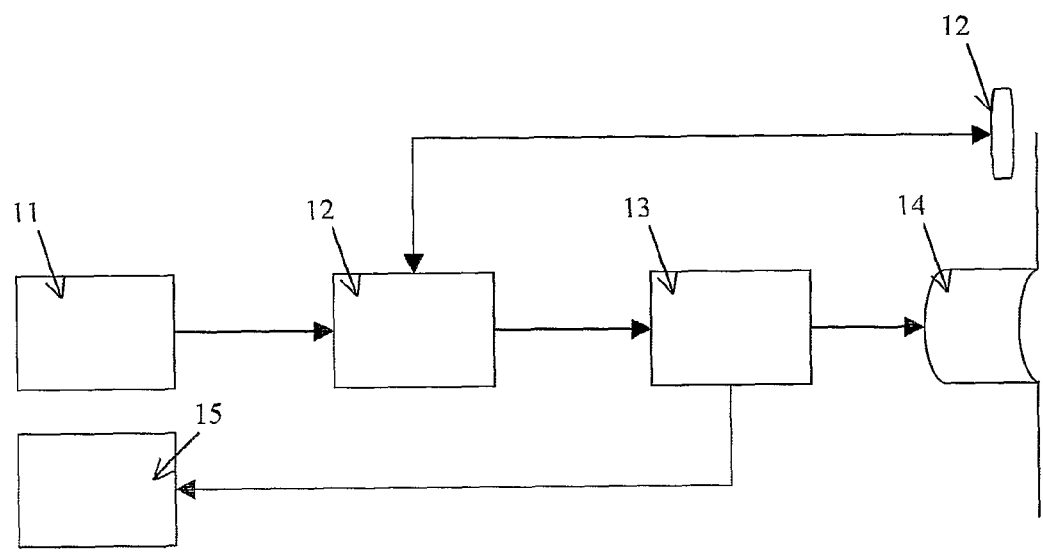
FIG. 4 is the illustration of the way in which the device is connected to an ATM machine.

The purpose of this invention is to prevent reading of cards with a magnetic stripe in the restricted area. For this purpose, the block diagram in FIG. 1 is made.

In order to attain this purpose, it is required that an electromagnetic field be created around an inductive charge (4).

For this electromagnetic field to be created, the electronic circuit made needs to have a power input (10) and this power input should be regulated in line with the required voltage values. +12V (2) and +5V (3) are the regulating circuits. For ruining the data obtained by the card reading device during reading, the electromagnetic field required to be formed needs to be in certain frequencies. This frequency is obtained at oscillator A (6). Conveying frequency is produced at oscillator B (5). It is conveyed to coil L1 (4) over the driver circuit (9) and it spreads from here as electromagnetic wave. If coil L1 (4) is removed from its setting, this is noticed through the feedback (8) path and the control output (7) is positioned as an abnormal situation indicator. The same situation also applies to power input (10). If power input (10) is interrupted for some reason, the power circuit (1) will not operate and the control output (7) will be in abnormal status.

As this device can be utilized anywhere, it is actually designed to be utilized in ATM's. Its connection to ATM's will be described below.

The card reader (13) circuit obtains the power that is needed for it to operate from the power supply (11) unit; and when a card comes to the card Insertion slot (14), the card reader (13) unit reads and evaluates the data on this card and communicates them to the computer (15) in the ATM. There are no problems as far as here. The problem will start when another card reader (16) is installed in front of the card insertion slot (14) and on the exterior surface of the ATM device.

As it is required that the card desired to be inserted into the card insertion slot (14) pass through the illegal card reader (16), the data 5 on the card will be read and stored by the illegal card reader (16) also. This is an undesired situation. To prevent this, a coil (17) is placed immediately underneath the card insertion slot (14). The coil's forming an electromagnetic field in the way desired is attained. The process of operating this coil is performed by the device (12). The device (12) obtains its power from the ATM power supply (10) (11), and ensures that the card reader unit (13) is also fed. If there is a problem in the coil (17) or the power supply (11), the card reader unit (13) will not operate and as it will not be possible for the card to enter the card insertion slot (14), as the card will not pass through the illegal card reader, no data will be read and it will not be able to perform recording. If there is no problem whatsoever with the power supply or the other elements, in this case, due to the electromagnetic field spread by the coil (17), the illegal card reader will not be able to perform reading and as a result will not be able to record the data on a card that passes through it.

What is claimed is:
1. A card reading machine comprising:
a card reader operable to read data on a magnetic card by receiving data signals generated in the card reader as the magnetic card is passed along the card reader, the data signals being at a select frequency range; and
a device for preventing reading of the data on the magnetic card by an illegal card reading device operatively associated with the card reading machine, the illegal card reading device reading data on the magnetic card by receiving signals generated in the illegal card reading device as the magnetic card is passed along the illegal card reading device corresponding to the data signals, the signals generated by the illegal card reading device being at the select frequency range of the data signals,
wherein the device for preventing reading comprises an oscillator, a driver circuit and a coil for generating variable preventing signals at the select frequency range when the magnetic card is passed along the illegal card reading device, the variable preventing signals and the signals generated in the illegal card reading device as the magnetic card is passed along the illegal card reading device combining at the illegal card reading device to form a combined signal at the select frequency range from which the variable preventing signals and the signals generated in the illegal card reading device as the magnetic card is passed along the illegal card reading device cannot in practice be filtered from each other, such that the illegal card reading device cannot read the magnetic card data of the magnetic card.

2. The card reading machine of claim 1, further comprising a card insertion slot for receiving the magnetic card in operative association with the card reader, the device preventing reading providing the variable preventing signals combining with the signals generated in the illegal card reading device as the magnetic card is passed along the illegal card reading device operatively associated with the insertion slot.

3. The card reading machine of claim 1, wherein the variable preventing signals are self-repeating.

4. The card reading machine of claim 1, further comprising a control operatively associated with the coil to indicate an abnormal situation if the coil is removed.

5. The card reading machine of claim 4, further comprising the control indicating an abnormal situation if power to the coil is interrupted.

6. The card reading machine of claim 5, further comprising the control disabling the power circuit.

7. The card reading machine of claim 2, wherein the coil is placed near the insertion slot.

8. The card reading machine of claim 4, wherein the operative association between the coil and the control is provided by a feedback path.

9. The card reading machine of claim 1, wherein the card reading machine is an automated teller machine.

10. The card reading machine of claim 1, wherein the magnetic card comprises a magnetic stripe on the card.

11. A device for preventing reading of data on a magnetic card by an illegal card reading device on a card reading machine, the device comprising means for providing an electromagnetic field ruining the data obtained by the illegal card reader, wherein the means for providing the electromagnetic field comprises an oscillator, a driver circuit and a coil for generating variable preventing signals at the select frequency range of the signals generated in the illegal card reading device as the magnetic card is passed along the illegal card reading device which are combined with signals generated in the illegal card reading device to form a combined signal at the select frequency range from which the variable preventing signals and signals generated in the illegal card reading device as the magnetic card is passed along the illegal card reading device cannot in practice be filtered from each other, such that the illegal card reading device cannot record the magnetic card data of the magnetic card.

12. The device of claim 11, further comprising a power input, a control and a control output.

13. The device of claim 12, further comprising a feedback path from the coil to the control, wherein the control output is positioned as an abnormal situation indicator if the coil is removed.

14. The device of claim 13, wherein the control output is positioned as an abnormal situation indicator if power to the device is interrupted.

15. A method of preventing reading of data on a magnetic card by an illegal card reader in operative association with an apparatus having a card reader intended to read the data on the magnetic card, the method comprising:
producing a variable preventing signal preventing reading of the data collected by the illegal card reader,
wherein the preventing signal is at the same frequency range as signals generated in the illegal card reader as the magnetic card is passed along the illegal card reader that the variable preventing signals and signals generated in the magnetic card reader as the magnetic card is passed along the illegal card reader create combined signals at the select frequency range which cannot in practice be filtered from each other, such that the illegal card reading device cannot read the magnetic card data of the magnetic card.

16. The method of claim 15, wherein the apparatus having a card reader intended to read data on a magnetic card comprises an insertion slot for the magnetic card, the method further comprising:
producing the variable preventing signal near the insertion slot.

17. The method of claim 15, wherein the variable preventing signal produced is self-repeating.

* * * * *